United States Patent [19]
Johnstone

[11] Patent Number: 4,627,463
[45] Date of Patent: Dec. 9, 1986

[54] FUEL PRESSURE REGULATOR
[75] Inventor: David L. Johnstone, Waterford, Mich.
[73] Assignee: Tom McGuane Industries, Inc., Madison Heights, Mich.
[21] Appl. No.: 721,958
[22] Filed: Apr. 11, 1985
[51] Int. Cl.[4] .................................... F16K 31/12
[52] U.S. Cl. .................................... 137/510; 251/84; 123/512
[58] Field of Search .............. 137/510; 251/84; 123/511, 512, 514, 459, 463

[56] References Cited
U.S. PATENT DOCUMENTS
3,160,391 12/1964 Medicus .................... 251/84 X
4,431,026 2/1984 Fehrenbach ................. 137/510

FOREIGN PATENT DOCUMENTS
2263383 10/1975 France .................... 137/510

Primary Examiner—Harold W. Weakley
Attorney, Agent, or Firm—Barnes, Kisselle, Raisch, Choate, Whittemore & Hulbert

[57] ABSTRACT

A fuel pressure regulator comprising a housing, a diaphragm dividing the housing into a first chamber and second chamber, a passage from the exterior of the housing to the first chamber, an inlet and an outlet associated with the second chamber of the housing, and a valve seat associated with the outlet. A cage is mounted on and movable with the diaphragm and a spring within the first chamber yieldingly urges the cage toward the valve seat. The cage supports a pair of plates which retain a valve ball. The first plate has an opening through which a portion of the ball projects and a second plate retains the first plate and the ball within the cage. The first plate is movable transversely to provide for proper centering of the ball in the valve seat. A light spring extends between the cage and the ball to urge the ball against the first plate.

3 Claims, 2 Drawing Figures

FUEL PRESSURE REGULATOR

This invention relates to fuel pressure regulators.

BACKGROUND AND SUMMARY OF THE INVENTION

In fuel injection systems of the port injection or throttle body type, it is common to provide fuel pressure regulators which function by having a fuel pump to supply fuel to the regulator at an inlet to cause a diaphragm assembly to move away from a valve seat to control the fuel flow through the outlet of the regulator and to the tank. Pressure is maintained at the desired pressure differential between the pump and the outlet of the regulator. The fuel pump displaces a fixed flow rate so the amount of fuel returned to the tank varies with engine speed, the largest return rate occurring at idle. When the fuel pump is stopped the regulator starts to close then acts as a shut off valve to maintain pressure on the system.

In one common type of regulator as shown in U.S. Pat. No. 3,511,270, the valve comprises a small ball attached to a plate which allows for angular misalignments of the diaphragm assembly to the valve seat. In that arrangement, accurate complementary flat surfaces must be provided on both the ball and the plate. In U.S. Pat. No. 4,237,924, a spherical ball having a flat portion is seated in a socket member which is yieldingly urged by a diaphragm to bring the flat portion against an annular valve seat. Accurate flat surfaces are also required in such an arrangement.

Among the objects of the present invention are to provide a fuel pressure regulator which obviates the need for accurate formation of flat surfaces and the like and which can be manufactured at low cost.

The fuel pressure regulator embodying the invention comprises a housing, a diaphragm dividing the housing into a first chamber and second chamber, a passage from the exterior of the housing to the first chamber, an inlet and an outlet associated with the second chamber of the housing, and a valve seat associated with the outlet. A cage is mounted on and movable with the diaphragm and a spring within the first chamber yieldingly urges the cage toward the valve seat. The cage supports a pair of plates which retain a valve ball. The first plate has an opening through which a portion of the ball projects and a second plate retains the first plate and ball within the cage. The first plate is movable laterally to provide for proper centering of the ball in the valve seat. A light spring extends between the cage and the ball to urge the ball against the first plate.

DESCRIPTION

Figure 1:
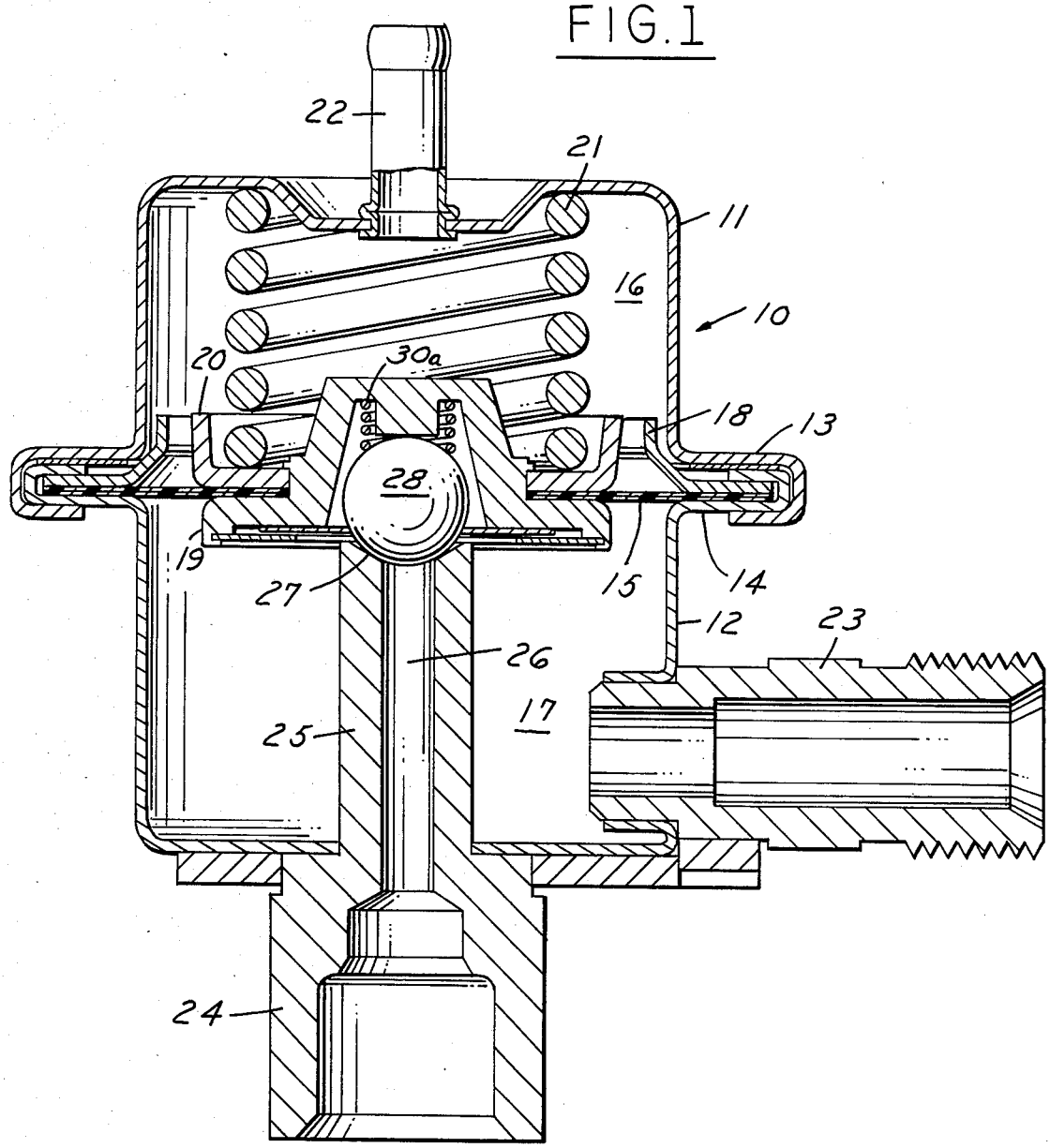
FIG. 1 is a sectional view through a fuel pressure regulator embodying the invention.
Figure 2:
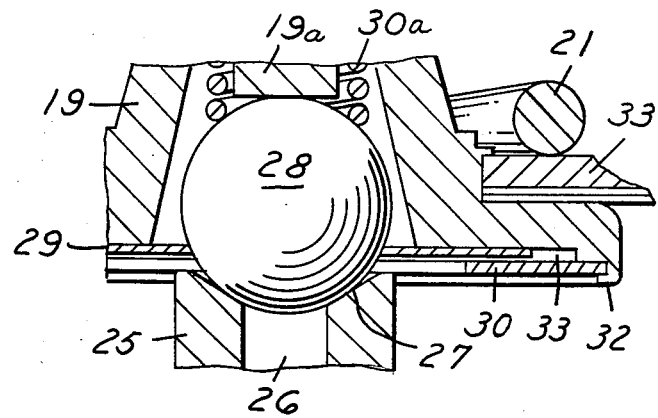
FIG. 2 is a fragmentary view on an enlarged scale of a portion of the fuel pressure regulator shown in FIG. 1.

Referring to FIG. 1, the fuel pressure regulator embodying the invention comprises a housing 10 consisting of two halves 11, 12 that are clamped together by holding flange 13 over flange 14. A diaphragm 15 is provided between the housing halves 11, 12 and may be made of two layers of elastic material such as fabric reinforced fluoro-silicone. The diaphragm 15 divides the housing into a first chamber 16 and a second chamber 17. A clamping spacer 18 is interposed between the flanges 13, 14 and diaphragm 15. The diaphragm supports a cage 19 and the cage is held in position by a spring retainer 20, that is connected to the cage by staking. A compression spring 21 urges the retainer 20 and cage 19 downwardly as shown in FIG. 1. The chamber 16 includes a passage or vacuum fitting 22. An inlet fitting 23 is provided to chamber 17 and an outlet fitting 24 is provided to the chamber 17 and includes a projection 25 having a passage 26 extending upwardly adjacent the diaphragm and defining a frustoconical seat 27. The cage 19 supports a ball 28 which is retained in position by plates 29, 30. The plate 29 includes an opening having a diameter less than the diameter of the ball valve 28 and the light spring 30$a$ yielding the urges to ball downwardly in the opening into the plate 29. Spring 30$a$ surrounds an axial projection 19$a$. The second plate 30 is retained in the lower end of the cage by a stake 32. The outer diameter of the first plate 29 is less than the outer diameter of the space 33 into which it fits so that the plate 29 can move laterally permitting movement of the ball to accommodate misalignment between the ball and valve seat 27.

In operation, when the ignition is turned on, fuel is introduced by the fuel pump to inlet 23 and forces the diaphragm upwardly permitting fuel to flow through the passage 26 out of the regulator to the fuel tank. As manifold vacuum of the engine changes, the vacuum applied to vacuum passage 22 causes the diaphragm to move the ball away from or closer to the seat and the amount of fluid passing through the outlet is changed, maintaining a constant pressure differential across the injectors.

I claim:
1. A fuel pressure regulator comprising a housing,
   a diaphragm dividing the housing into a first chamber and second chamber,
   a passage from the exterior of the housing to said first chamber,
   an inlet and an outlet associated with the second chamber of the housing,
   a frustoconical valve seat associated with the outlet,
   a cage mounted on and movable with the diaphragm,
   a spring within the first chamber yieldingly urging the cage toward the valve seat,
   a cage,
   a first plate fixedly mounted on said cage and having an opening therethrough,
   a second plate overlying said first plate and having an opening therethrough,
   a ball positioned between said cage and said second plate and engaging the opening in said second plate,
   said cage having a cavity into which said ball is attached,
   said ball being rotatable relative to said second plate,
   the opening in said second plate having a diameter less than the diameter of said ball,
   the diameter of the opening in said first plate being less than the outer diameter of said second plate,
   a light spring interposed between said cage and said ball urging said ball through the opening in said first plate toward said valve seat,
   the outer diameter of said second plate being less than the diameter of the portion of the cage which surrounds the periphery of said second plate such that said ball and said second plate can move laterally to accommodate any misalignment between the ball and the valve seat.

2. The fuel pressure set forth in claim 1 wherein said cage has an axial portion extending toward said ball and being adapted to engage said ball.

3. The fuel pressure regulator set forth in claim 2 wherein said light spring comprises a helical spring about said axial portion of said cage.

* * * * *